United States Patent
Jobst et al.

(10) Patent No.: US 10,242,811 B2
(45) Date of Patent: Mar. 26, 2019

(54) MOTOR DRIVE WITH DISENGAGEABLE COUPLING

(71) Applicant: Maschinenfabrik Reinhausen GmbH, Regensburg (DE)

(72) Inventors: Johann Jobst, Regenstauf (DE); Michael Goss, Deuerling (DE); Christian Pircher, Lappersdorf (DE)

(73) Assignee: MASCHINENFABRIK REINHAUSEN GMBH, Regensburg (DE)

( * ) Notice: Subject to any disclaimer, the term of this patent is extended or adjusted under 35 U.S.C. 154(b) by 132 days.

(21) Appl. No.: 15/318,601

(22) PCT Filed: Jul. 13, 2015

(86) PCT No.: PCT/EP2015/065963
§ 371 (c)(1),
(2) Date: Dec. 14, 2016

(87) PCT Pub. No.: WO2016/015986
PCT Pub. Date: Feb. 4, 2016

(65) Prior Publication Data
US 2017/0110265 A1   Apr. 20, 2017

(30) Foreign Application Priority Data

Jul. 29, 2014   (DE) .................. 10 2014 110 731

(51) Int. Cl.
*H01H 9/00* (2006.01)
*H01H 3/32* (2006.01)
(Continued)

(52) U.S. Cl.
CPC ............ *H01H 9/0033* (2013.01); *H01H 3/32* (2013.01); *H01H 3/58* (2013.01); *H01H 9/0027* (2013.01);
(Continued)

(58) Field of Classification Search
CPC .. G01D 3/10; G01D 5/02; G01D 5/04; G01D 5/06; G01D 5/08; G01D 5/10; H01H 3/32;
(Continued)

(56) References Cited

U.S. PATENT DOCUMENTS 1,456,313 A * 5/1923 Johanson ................. G07C 1/30
116/305
2,693,573 A   11/1954 Perkins
(Continued)

FOREIGN PATENT DOCUMENTS

EP             35604 A1 * 9/1981 ............... H01H 3/58

*Primary Examiner* — R. A. Smith
(74) *Attorney, Agent, or Firm* — Andrew Wilford

(57) ABSTRACT

A motor drive for actuation of an on- or off-load tap changer the drive has a drive motor, a load transmission having a first drive shaft carrying a first drive wheel and connected with the drive motor and a second drive shaft carrying a second drive wheel, and a mechanical coupling between the first and second drive wheels. The second drive shaft is operatively connected at a first end with the on- or off-load tap changer and at a second end with an indicator transmission. A setting indicator operatively connected with the indicator transmission displays the current setting of the on- or off-load tap changer, and a disengageable coupling is provided between the setting indicator and the load transmission.

11 Claims, 3 Drawing Sheets

(51) Int. Cl.
*H01H 3/58* (2006.01)
*H01H 19/12* (2006.01)
*H02K 7/116* (2006.01)

(52) U.S. Cl.
CPC ............ *H01H 19/12* (2013.01); *H02K 7/116* (2013.01); *H01H 2003/323* (2013.01)

(58) Field of Classification Search
CPC .. H01H 3/54; H01H 3/56; H01H 3/58; H01H 2003/323; H01H 9/00; H01H 9/0005; H01H 9/0027; H01H 9/0033; H01H 19/12; H02K 7/116
USPC ................ 116/284, 297; 200/6 R, 11 TC, 47
See application file for complete search history.

(56) References Cited

U.S. PATENT DOCUMENTS

| | | | | |
|---|---|---|---|---|
| 2,768,946 | A | * | 10/1956 | Filippi et al. .......... G01G 23/14 116/290 |
| 3,266,583 | A | * | 8/1966 | Hale ........................ G01G 5/00 116/301 |
| 6,234,106 | B1 | | 5/2001 | Dohnal |
| 7,343,873 | B2 | | 3/2008 | Hernandez |
| 2002/0094702 | A1 | | 7/2002 | Herz |
| 2014/0167529 | A1 | | 6/2014 | Teising |

* cited by examiner

MOTOR DRIVE WITH DISENGAGEABLE COUPLING

CROSS REFERENCE TO RELATED APPLICATIONS

This application is the US-national stage of PCT application PCT/EP2015/065963 filed 13 Jul. 2015 and claiming the priority of German patent application 102014110731.4 itself filed 29 Jul. 2014.

FIELD OF THE INVENTION

The present invention relates to a motor drive that has a setting indicator for actuation of an on- or off-load tap changer.

BACKGROUND OF THE INVENTION

In order to change the translation ratio of an oil-insulated transformer under load there are provided, depending on the respective purpose of use, so-called tap changers, on-load tap changers or off-load tap changers, whose configuration and mode of operation of which are known in principle and that are constructed for connecting the winding taps of a tap winding of a transformer.

An on-load tap changer of that kind connected with a tap winding usually comprises a load changeover switch and a selector, in which case the selector preferably consists of a preselector and a fine selector. The fine selector is provided for power-free selection of the winding tap that is to be connected, of the tap winding and the preselector for increasing the regulating range, wherein the preselector depending on the respective case of use can be constructed either as a reverser for the switching on and off of the tapped winding or as a coarse selector for coupling the tapped winding to the start or the end of the main winding of the transformer.

The load changeover itself is carried out by the load changeover switch of the on-load tap changer and, in particular, from the previous winding tap to the new, preselected winding tap of the tapped winding of the transformer. For that purpose, the load changeover switch usually comprises mechanical switching contacts and resistance contacts, wherein the switching contacts serve for direct connection of the respective winding taps with the load diverter and the resistance contacts serve for temporary bridging over by one or more switching-over resistances. However, developments in recent years have led away from load changeover switches with mechanical switching contacts and toward the use of vacuum interrupters or semiconductor switching elements, particularly power switching elements, as switching elements for high voltages and currents, for example thyristors, GTOs, IGBTs and other components.

Integrated on-load tap changers, also called load selectors, form a further category of on-load tap changers. Here the load changeover switch and the fine selector are incorporated in one unit. When actuated, in one step the winding tap to be connected is preselected and subsequently connected. This form of realization of an on-load tap changer can also comprise a preselector arranged either outside or within the housing of the on-load tap changer and, in particular, in an insulating medium, preferably insulating oil.

By contrast, off-load tap changers for tapped transformers serve for power-free, i.e. voltage-free or current-free, switching over between different winding taps of the tapped transformer connected with the off-load tap changer.

An off-load tap changer of that kind substantially consists of a plurality of contact rods circularly arranged around a center longitudinal axis and a central, rotatably mounted switching shaft to which a contact arrangement is attached. The contact arrangement serves for electrical contacting of two, preferably adjacent, contact rods with one another so as to thereby produce a defined transformation ratio of the transformer connected with the off-load tap changer.

In order to actuate both on-load tap changers and off-load tap changers these are usually connected by a linkage with a motor drive serving for setting the on- or off-load tap changer to the respectively desired operational setting. All essential mechanical and electrical subassemblies necessary for drive of the on- or off-load tap changer are combined in the motor drive. A motor drive of that kind also comprises, inter alia, a setting indicator with a switching step pointer and a setting pointer that are both actuated by a control drive and/or indicator drive. In that case, the setting indicator represents the currently activated setting of the on- or off-load tap changer, whereas the switching step pointer indicates whether an initiated switching-over process has in fact been completely executed. In such a case the switching step pointer will have run through a complete 360° rotation.

In that case, in the prior art the entire drive train of the on- or off-load tap changer up to the setting indicator in the motor drive is constructed as a continuous drive train that produces kinematic constrained movement of all individual subassemblies provided within this drive train. If the on- or off-load tap changer now has to be taken apart at specific time intervals for inspection purposes and serviced then after reinstallation it has to be ensured that the currently activated setting of the on- or off-load tap changer corresponds as before with the currently indicated setting of the setting indicator in the motor drive. In other words, the switch setting of the on- or off-load tap changer and that of the setting indicator have to coincide. For that purpose it is necessary with the prior art to release, i.e. take apart, the linkage that is fixedly connected with the motor drive in operation and that leads to the on- or off-load tap changer and to manually allow the motor drive to run until the switch setting indicated at the setting indicator corresponds with the actual setting activated by the on- or off-load tap changer. This manual readjustment is in that regard time-consuming and susceptible to error.

OBJECT OF THE INVENTION

The object of the invention is to indicate a motor drive for actuation of an on- or off-load tap changer, which eliminates the afore-mentioned disadvantages.

SUMMARY OF THE INVENTION

The invention proposes a motor drive for actuation of an on- or off-load tap changer and comprising a drive motor that drives at least one load transmission and indicator transmission, wherein the load transmission comprises a first drive shaft with a first drive wheel that is mechanically connected therewith and connected with the drive motor, and a second drive shaft with a second drive wheel that is connected therewith, wherein the first and second drive wheels are mechanically coupled, wherein the second drive shaft in turn is in operative connection at its first end with the on-load tap changer or the off-load tap changer and is connectable by its second end with the indicator transmission, wherein the indicator transmission co-operates with a setting indicator by means of which the currently activated setting of the on- or off-load tap changer can be indicated and wherein a switchable coupling is provided between the setting indicator and the load transmission.

With particular preference, the coupling is constructed to be switchable in such a way that in the decoupled state the setting indicator is kinematically separated from the introduced rotational movement of the drive motor and in the coupled state the setting indicator is kinematically constrainedly coupled with the introduced rotational movement of the drive motor.

With further preference the coupling comprises a first coupling gear arranged at a drive input shaft to be secure against relative rotation, a second coupling gear arranged at a drive shaft to be secure against relative rotation and to be parallel with the first coupling gear and an axially displaceable coupling pin that is arranged parallel to the drive input shaft, with a third coupling gear secure against rotation relative to the coupling pin and able to be brought into mesh with the first and second coupling gears.

In advantageous manner, the coupling pin is axially displaceable between a coupled position in which the third coupling gear is in mesh with the first and second coupling gears and a decoupled position in which the third coupling gear is in mesh exclusively with the first coupling gear.

According to an alternative form of embodiment the coupling comprises a drive input shaft with a compression spring arranged between an abutment element and a cone bushing, an output drive shaft with a frustoconical end facing the cone bushing, the cone bushing—which has an encircling groove—being axially displaceable between the input drive shaft and the drive shaft, and an axially displaceable coupling pin engaging in the cone bushing by a connecting fork.

With further advantage the coupling pin is axially displaceable between a coupled position in which the cone bushing is connected by friction couple with the frustoconical end of the drive shaft and a decoupled position in which the cone bushing is displaced by the connecting fork toward the abutment so that the connection by friction couple releases.

With further preference, provided in the cone bushing is a recess in which a pin arranged at the drive input shaft engages in such a way that in the case of rotational movement of the drive input shaft the pin transmits torque to the cone bushing in that the pin is supported by the outer circumferential surface thereof on the inner side of the recess.

BRIEF DESCRIPTION OF THE DRAWING

Embodiments of the invention are explained in more detail in the following on the basis of the accompanying drawings. However, the individual features evident therefrom are not restricted to the individual embodiments, but can be linked and/or combined with further above-described individual features and/or with individual features of other embodiments. The details in the drawings are to be understood as merely explanatory and not limiting. The reference numerals present are not to restrict the scope of protection of the invention in any way, but refer merely to the embodiments shown in the drawings. In the drawings.

SPECIFIC DESCRIPTION OF THE INVENTION

Figure 1:
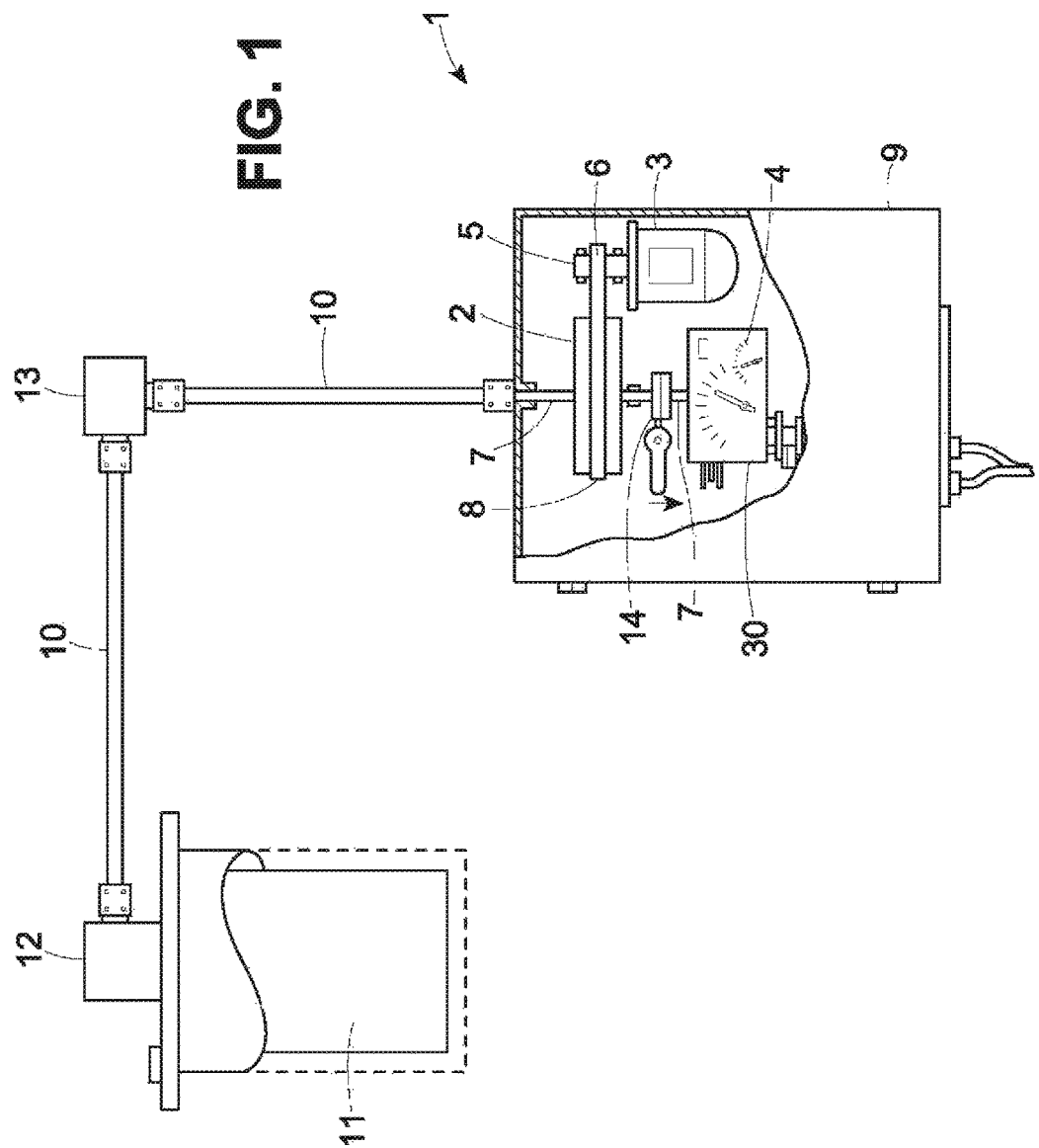
FIG. 1 is a schematic illustration of a motor drive according to the invention with an on- or off-load tap changer connected by way of a linkage.

A motor drive 1 according to the invention with an on- or off-load tap changer that is connected by way of a linkage, is schematically illustrated in FIG. 1. For reasons of clarity, only components essential to function are illustrated in the FIGS. and described. The motor drive 1 in that case comprises, inter alia, a load transmission 2, a drive motor 3 and a setting indicator 4 with an indicator transmission 30 that is not illustrated in more detail here. The indicator transmission 30 can also be constructed as a control transmission. All above-described components of the motor drive 1 are arranged within a common housing 9. Disposed in the interior of the load transmission 2 is a first drive shaft 5 that is driven by the drive motor 3 and that is mechanically connected with a first drive wheel 6. Moreover, a second drive shaft 7 that is mechanically connected with a second drive wheel 8, is similarly disposed in the interior of the load transmission 2. The first and second drive wheels 6 and 8 can in that case be constructed as gears that interengage. Alternatively, it is also conceivable for the two drive wheels 6 and 8 to be driven by way of a common belt tensioned over the end faces of the drive wheels 6 and 8. A number of alternatives that can be employed here, with respect thereto are known to the expert. The second drive shaft 7 is in turn in operative connection, by way of the mechanical force couple of the second drive wheel 8 with the second drive shaft 7, at its first end with an on-load tap changer or an off-load tap changer 11 and is connectible by its second end with the indicator transmission 30. The mechanical connection between the on- or off-load tap changer 11 and the second drive shaft 7 is realized by a linkage 10 and intermediate transmission stages 12 and 13. Since this form of coupling by a linkage 10 and different transmission stages 12 and 13 has been known to the expert for decades from the prior art this is not discussed in more detail. In that case it is important that a kinematic flow of force between the first end of the second drive shaft 7 and the on- or off-load tap changer 11 takes place by the linkage 10 inclusive of the transmission stages 12 and 13 that is also termed drive train.

The second end of the second drive shaft 7 is connectible with the indicator transmission 30 and the setting transmission 4 by way of a switchable coupling 14. The coupling 14, the indicator transmission 30 and the setting indicator 4 are explained in more detail in the following figures. The coupling 14 is in that case constructed in such a way that it can interrupt the rotational movement introduced by the second drive shaft 7 to the indicator transmission 30, so that when the drive motor 3 is running only the drive train still rotates and the switch setting of the on- or off-load tap changer 11 changes, but not that of the setting indicator 4. Alternatively, it is also possible to change the switch setting of the setting indicator 4 by turning the switching step pointer 27. This can be carried out manually or in motor-controlled manner. For that purpose, for example, a further electric motor can be provided in the indicator transmission 30 of the setting indicator 4 and co-operates with the indicator transmission 30 so that ultimately the switching step pointer 27 and setting pointer 36 thus rotate.

Figure 2:
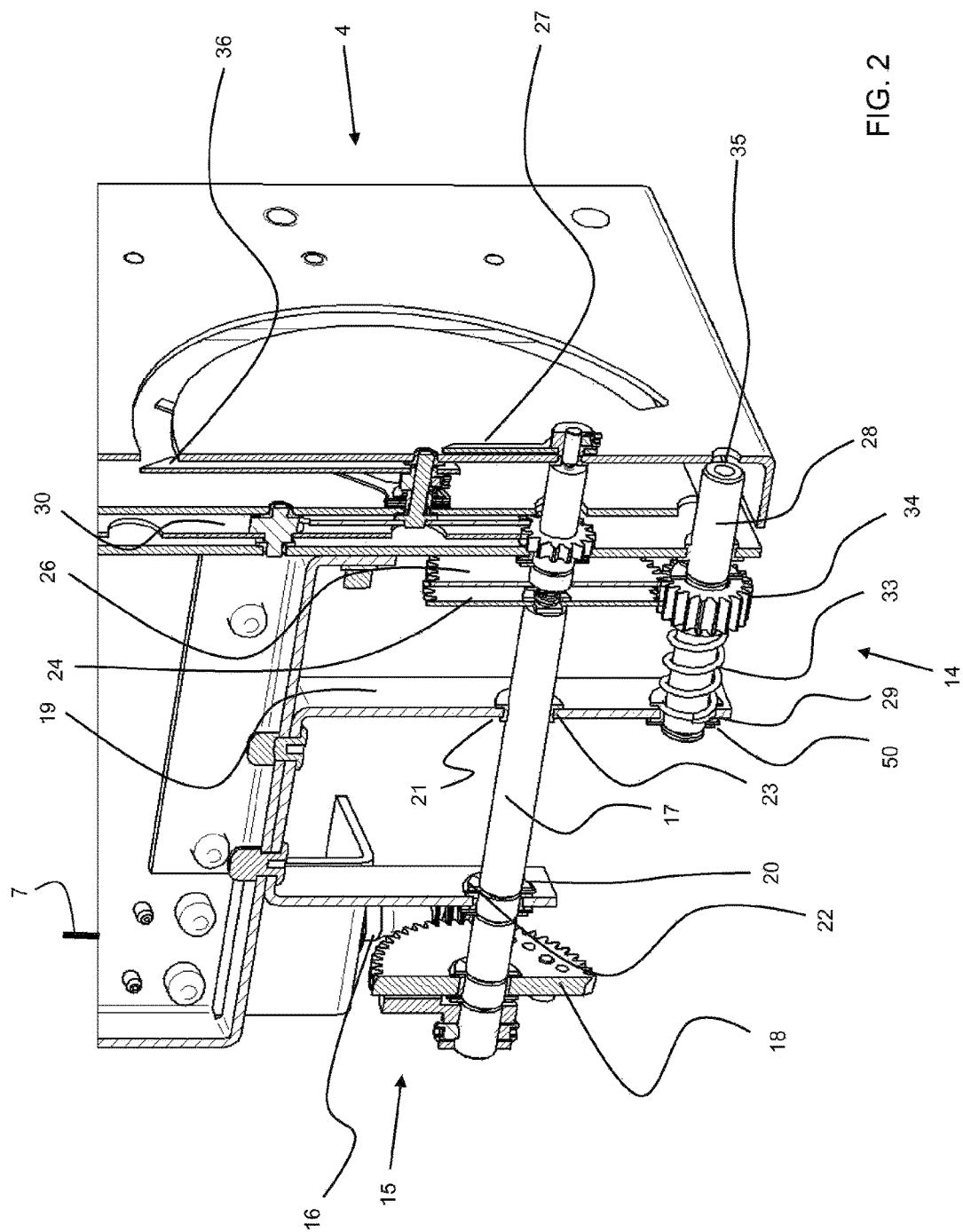
FIG. 2 is a side illustration of a detail view of a form of embodiment of a motor drive according to the invention and FIG. 3 is a side illustration of a detail view of a further form of embodiment of a motor drive according to the invention.

One form of embodiment of the invention is illustrated in a side view in FIG. 2, in which the coupling 14 is shown in detail. In this form of embodiment a worm-wheel transmission 15, comprising a worm wheel 16 and a gear 18 that is arranged at a drive input shaft 17 to be secure against relative rotation, is upstream of the coupling 14. The rotational movement introduced into the worm wheel 16 is in that case effected by of the second drive shaft 7 and is derived therefrom. The worm-wheel transmission 15 thus ensures, inter alia, shift in the movement direction of the rotational movement of the second drive shaft 7. The drive input shaft 17 is in turn mounted by a mounting bracket 19 that is of substantially U-shaped construction and that is arranged in the interior of the housing 9 of the motor drive 1. For this purpose, provided at the mounting bracket 19 are bearing mounting points 20 and 21 into which a respective bearing 22 or 23, constructed, for example, as a roller bearing, is insertable. The drive input shaft 17 is received by the bearings 22 and 23 to be rotatably mounted. A first coupling gear 24 is arranged at the end that is opposite the worm-wheel transmission 15, of the drive input shaft 17 to be secure against relative rotation. A drive shaft 25 of the indicator transmission 30 is provided at the end face toward the first coupling gear 24 in axial prolongation of the drive input shaft 17, on which drive shaft 25 a second coupling gear 26 is fastened to be secure against relative rotation and substantially parallel to and opposite the first coupling gear 24. A switching step pointer 27 of the setting indicator 4 is fastened to the other end of the drive shaft 25. In addition, a coupling pin 28 is provided substantially parallel to the drive input shaft 17 and is similarly guided to be rotatably mounted by a further bearing receiving point 29 that is provided at the mounting bracket 19, and a bearing 50 arranged therein as well as a corresponding bearing receiving point 31, together with bearing 32, provided in the indicator transmission 30. In addition, a compression spring 33 and a third coupling gear 34 are arranged on the coupling pin 28 between the two bearing receiving points 29 and 31. In that case, the coupling pin 28 is held in the coupled state under a certain degree of bias by the compression spring 33. The third coupling gear 34 can be arranged to be rotatably mounted on the coupling pin 28. The coupling pin 28 has an opening, for example in the form of a blind bore, at the end associated with the switching step transmission 30. The coupling pin 28 is in that case constructed in such a way that it is movable against the spring force of the compression spring 33 toward the bearing receiving point 29 in that, for example, it is pressed by a tool in the opening. The third coupling gear 34 is so dimensioned in its width that in the coupled state that is shown in FIG. 2, it is in mesh with the two first and second coupling gears 24 and 26. The rotational movement of the drive input shaft 17 is thus passed on by the coupling 14 to the drive shaft 25 so that ultimately the switching step pointer 27 can rotate through, preferably 360° when a switching-over process is carried out.

If the coupling pin 28 is now pressed by a tool against the spring force of the compression spring 33 toward the bearing receiving point 29 then the second coupling gear 26 thus comes out of mesh with the third coupling gear 34 so that ultimately the drive shaft 25 is decoupled from the introduced rotational movement of the drive motor 3 for the switching-over process and the switching step pointer 27 does not rotate. Alternatively, the switching step pointer 27 can rotate in the described mode and manner so that ultimately the setting pointer 36 changes its indicatable setting. Thus, in this setting of the coupling 14 and after inspection of the on- or off-load tap changer 11 has taken place it is possible in simple mode and manner to let the motor drive 1 rotate until the switching setting that is indicated at the setting indicator 4, corresponds with the setting actually activated by the on- or off-load tap changer 11. In that case, a setting pointer 36 indicates at the setting indicator 4 the respective currently activated setting of the on- or off-load tap changer 11, where against the switching step pointer 27 in the case of each completely executed switching-over process covers a full 360° revolution and thus confirms completion of the executed switching-over process to the next selected switch setting of the on- or off-load tap changer 11. The setting indicator 4 as well as the indicator transmission 30 are the subject of DE 197 07528 C1 attributable to the applicant. Text passages with respect thereto are expressly clarified by reference to the subject of this description. In particular, reference is made in this connection to FIGS. 1 and 2 of the cited German patent specification and FIG. description relating thereto.

Figure 3:
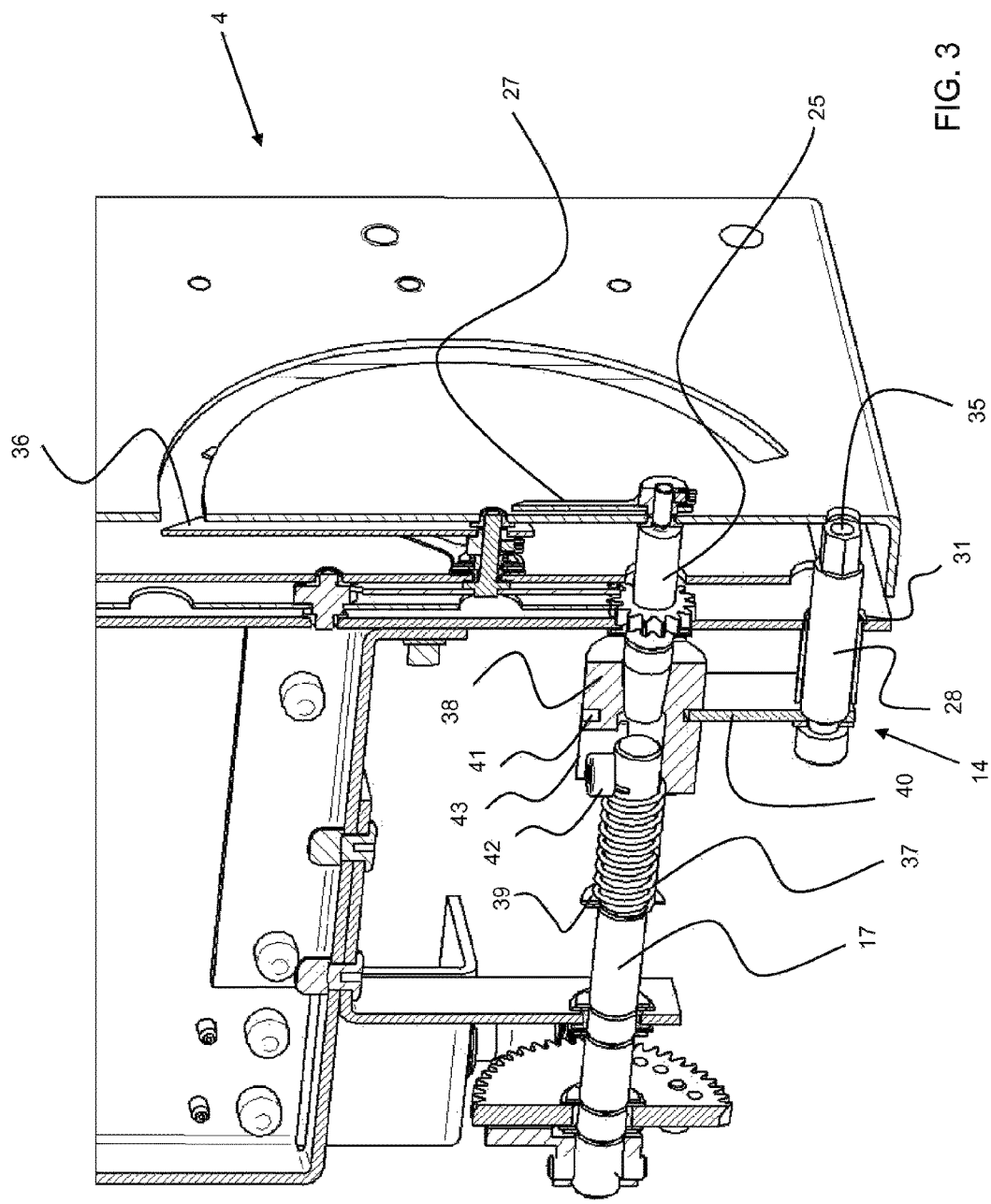

A further form of embodiment of the invention is illustrated in a side view in FIG. 3. In the following, essentially only the differences from the form of embodiment of the invention of FIG. 2 are described. In that case, the same or equivalent elements of the invention are discussed with identical reference numerals. The rotational movement diverted and translated by the worm-wheel transmission 15 takes place on the drive input shaft 17 that on the opposite the gear 18 receives a compression spring 37 and at the end a cone bushing 38, for example in the form of a clamping hub. The cone bushing 38 is in that case constructed in such a way that in the coupled state of the coupling transmission 14 that is illustrated in FIG. 3, it is urged by the compression spring 37 toward the drive shaft 25. For that purpose the compression spring 37 is supported at the end that is opposite the cone bushing 38, against an abutment element 39. The cone bushing 38 itself that is shown in cross-section in FIG. 3, forms together with the drive input shaft 17 a coaxial construction of such a kind that the cone bushing 38 can be displaced on the drive input shaft 17, against the spring force of the compression spring 37, along the shaft. The rotational movement of the drive input shaft 17 is transmitted to the cone bushing 38 in that provided in the cone bushing 38 is a recess 43 in which a pin 42 that is arranged at the drive input shaft 17, engages in such a way that the pin transmits torque to the cone bushing 38 in that it is supported by its outer circumference surface on the inner side of the recess 43. At the same time it is also possible by the geometric form of the recess 43 to define an abutment for the axial displaceability of the cone bushing 38, since the pin 42 also co-operates by its circumferential surface with the inner side of the recess 43. In addition, the drive shaft 25 that is here constructed as a cone shaft with a frustoconical end, is received, at the end toward the drive input shaft 17 and in alignment therewith, within the cone bushing 38. Here, too, the coupling pin 28 is received, substantially parallel to the drive input shaft 17, in the bearing receiving point 31 of the indicator transmission 4 and mechanically guided. The coupling pin 28 additionally comprises a connecting fork 40 that is detachably fastened to the end opposite the opening 35, for example by a screw connection. In addition, the connecting fork 40 engages in an encircling groove 41 provided at the cone bushing 38 and arranged at the circumference.

In the coupled state that is illustrated in FIG. 3, of the coupling 14 the cone bushing 38 and the drive shaft 25 by the frustoconical end thereof form a connection by friction couple so that the rotational movement introduced by way of the worm-wheel transmission 15 is transmitted to the indicator transmission 4. If the coupling pin 38 is now urged, for example by a tool, together with its connecting fork 40 and inclusive of cone bushing 38 against the spring force of the compression spring 37 toward the abutment element 39 then the friction connection between the cone bushing 38 and the drive shaft 25 is thereby cancelled. The indicator transmission 4 is thus kinematically separated from the drive input shaft 17 and, for example, the switching step pointer 27 can be freely rotated. When the coupling pin 28 is released, the cone bushing 38 springs back onto the cone shaft and the drive input shaft 17 is thus again connected with the indicator transmission 4 by friction couple, whereby the kinematic flow of force is reinstated.

The invention claimed is:

1. A motor drive for actuation of an on- or off-load tap changer the drive comprising:
   a drive motor;
   a load transmission having a first drive shaft carrying a first drive wheel and connected with the drive motor and a second drive shaft carrying a second drive wheel;
   a mechanical coupling between the first and second drive wheels;
   an indicator transmission;
   means operatively connecting the second drive shaft at a first end thereof with the on- or off-load tap changer, a second end of the second drive shaft being connected with the indicator transmission;
   a setting indicator operatively connected with the indicator transmission to display the current setting of the on- or off-load tap changer; and
   a disengageable coupling between the setting indicator and the load transmission.

2. The motor drive according to claim 1, wherein the disengageable coupling is switchable in such a way that in a decoupled state the setting indicator is kinematically separated from rotation of the drive motor and in a coupled state the setting indicator is kinematically coupled with the drive motor for rotation thereby.

3. The motor drive according to claim 1, wherein the disengageable coupling comprises:
   a first coupling gear rotationally fixed on a drive input shaft;
   a second coupling gear rotationally fixed on a third drive shaft parallel to the first coupling gear, and
   an axially displaceable coupling pin extending parallel to the drive input shaft and carrying a third coupling gear rotationally fixed on the coupling pin and meshable with the first and second coupling gears.

4. The motor drive according to claim 3, further comprising:
   a compression spring on the coupling pin and braced between a mounting bracket and the third coupling gear.

5. The motor drive according to claim 4, wherein the coupling pin is axially displaceable between a coupled position in which the third coupling gear meshes with the first and second coupling gears and a decoupled position in which in the third coupling gear meshes only with the first coupling gear.

6. The motor drive according to claim 3, wherein the coupling pin has an externally accessible opening.

7. The motor drive according to claim 3, wherein the third drive shaft is a cone shaft.

8. The motor drive according to claim 1, wherein the disengageable coupling comprises:
   a drive input shaft carrying a compression spring braced between an abutment and a cone bushing,
   an output drive shaft with a frustoconical end facing the cone bushing, the cone bushing being axially displaceable between the drive input shaft and the output drive shaft, and
   an axially displaceable coupling pin engaged in the cone bushing by a connecting fork.

9. The motor drive according to claim 8, wherein the cone bushing is a clamping hub.

10. The motor drive according to claim 8, wherein the coupling pin is axially displaceable between a coupled position in which the cone bushing is connected by friction with the frustoconical end of the output drive shaft and a decoupled position in which the cone bushing is displaced by the connecting fork toward the abutment so that the connection by friction releases.

11. The motor drive according to claim 8, wherein the cone bushing is formed with a recess in which a pin mounted on the drive input shaft so engages that on rotation of the drive input shaft the pin transmits torque to the cone bushing through the pin with its outer surface on an inner side of the recess.

* * * * *